(12) United States Patent  
Lock et al.

(10) Patent No.: US 8,037,556 B2
(45) Date of Patent: Oct. 18, 2011

(54) SHOWER CUBICLES (75) Inventors: Graham Robin Lock, Isle of Man (GB); Robert William Stimpson, Isle of Man (GB); James Self, Isle of Man (GB)

(73) Assignee: DLP Limited, Isle of Man (GB)

( * ) Notice: Subject to any disclaimer, the term of this patent is extended or adjusted under 35 U.S.C. 154(b) by 1211 days.

(21) Appl. No.: 11/571,063

(22) PCT Filed: Jun. 24, 2005

(86) PCT No.: PCT/GB2005/002485
§ 371 (c)(1), (2), (4) Date: Feb. 28, 2007

(87) PCT Pub. No.: WO2006/000783
PCT Pub. Date: Jan. 5, 2006

(65) Prior Publication Data
US 2008/0022452 A1    Jan. 31, 2008

(30) Foreign Application Priority Data
Jun. 24, 2004 (GB) .................................. 0414115.6

(51) Int. Cl.
*A47K 3/00* (2006.01)
(52) U.S. Cl. ............ 4/614; 4/596; 4/612; 4/613; 52/264
(58) Field of Classification Search ...... 4/596, 612–614; 52/79.1, 79.4, 264, 265
See application file for complete search history.

(56) References Cited

U.S. PATENT DOCUMENTS

| 2,282,362 | A | * | 5/1942 | Johnson | .......................... 4/614 |
| 3,149,347 | A | * | 9/1964 | Embroden | .................... 52/264 |
| 3,281,172 | A | | 10/1966 | Kuehl | |

(Continued)

FOREIGN PATENT DOCUMENTS

DE    9417351.6    3/1995

(Continued)

OTHER PUBLICATIONS

International Search Report published Jan. 5, 2006 for PCT/GB2005/002485 filed Jun. 24, 2005.

(Continued)

*Primary Examiner* — Steven J Ganey
(74) *Attorney, Agent, or Firm* — Martin Fleit; Paul D. Bianco; Fleit Gibbons Gutman Bongini & Bianco PL (57) ABSTRACT

A shower cubicle panel comprises a main panel element (14) of composite construction with at least two layers of different material, and means for interconnecting the cubicle panel (10) to an adjacent panel (10) and a shower tray (80). A connector for adjacent shower cubicle panels comprises a first part (36), a second part (38). The first part (36) has a first elongate channel portion (22b) for receiving an edge of a first shower cubicle panel, and a male connector portion (42). The second part (38) has a second elongate channel portion (22b) for receiving an edge of a second shower cubicle panel, and a female connector portion (50) substantially complementarily shaped to receive the male connector portion (42). A sealing element (40) is interposable between the first and second parts (36, 38) for preventing their disengagement.

26 Claims, 5 Drawing Sheets

U.S. PATENT DOCUMENTS

| | | | |
|---|---|---|---|
| 3,420,021 A | | 1/1969 | Anghinetti et al. |
| 4,384,377 A | * | 5/1983 | Calvert et al. ............... 4/614 |
| 4,423,528 A | * | 1/1984 | Wiedmeier ............... 4/613 |
| 4,671,026 A | * | 6/1987 | Wissinger ............... 4/614 |
| 4,720,876 A | * | 1/1988 | Tomei et al. ............... 4/614 |
| 4,779,707 A | * | 10/1988 | Smith et al. ............... 52/264 |
| 4,993,201 A | | 2/1991 | Bunyard |
| 6,698,037 B2 | | 3/2004 | Lippe |
| 2003/0188379 A1 | | 10/2003 | Cowell et al. |
| 2004/0078890 A1 | | 4/2004 | Tavivian |

FOREIGN PATENT DOCUMENTS

| | | |
|---|---|---|
| EP | 0272554 | 12/1987 |
| GB | 1111441 | 4/1968 |
| GB | 1243687 | 8/1971 |
| GB | 2329333 | 3/1999 |
| GB | 2347166 | 8/2000 |
| GB | 2367569 | 4/2002 |
| GB | 2374612 | 10/2002 |
| JP | 11-336226 | 7/1999 |

OTHER PUBLICATIONS

International Preliminary Report on Patentability published Dec. 28, 2006 for PCT/GB2005/002485 filed Jun. 24, 2005.

Written Opinion of the International Searching Authority published Dec. 24, 2006 for PCT/GB2005/002485 filed Jun. 24, 2005.

British Search Report searched Sep. 10, 2004 for GB0414115.6 filed Jun. 24, 2004.

* cited by examiner

SHOWER CUBICLES

FIELD OF THE INVENTION

The present invention relates to a shower cubicle, a shower cubicle panel, to a connector for connecting adjacent shower cubicle panels, and to a connector for connecting a shower cubicle panel to a shower tray.

BACKGROUND OF THE INVENTION

Present shower cubicles are reasonably complex and time-consuming to erect. The associated panels are heavy, cumbersome and unwieldy, making assembly problematic. It is therefore an object of the present invention to provide an easy to assemble shower cubicle which is, at least in part, prefabricated, and also to provide shower cubicle panels which are easy to handle and interengage.

SUMMARY OF THE INVENTION

According to a first aspect of the present invention, there is provided a shower cubicle panel comprising a main panel element which is a composite construction of at least two layers of different material and means for directly interconnecting the cubicle panel to an adjacent panel and/or a shower tray, the interconnecting means being provided on the peripheral edge or edges of the main panel element.

Preferable and/or optional features of the first aspect of the invention are set forth in claims 2 to 16, inclusive.

According to a second aspect of the present invention, there is provided a connector for connecting adjacent shower cubicle panels, the connector comprising a first elongate channel portion for receiving a first edge of a first shower cubicle panel, a second elongate channel portion for receiving a second edge of a second shower cubicle panel, and a connector portion disposed between and interconnecting the first and second channel portions.

Preferable and/or optional features of the second aspect of the invention are set forth in claims 18 to 22, inclusive.

According to a third aspect of the present invention, there is provided a connector for connecting adjacent shower cubicle panels, the connector comprising a first part having an elongate channel portion for receiving an edge of a first shower cubicle panel and a male connector portion; a second part having an elongate channel portion for receiving an edge of a second shower cubicle panel and a female connector portion complementarily or substantially complementarily shaped to receive the male connector portion of the first part of the connector; and a sealing element which is interposable between at least part of the first and second parts of the connector for preventing or limiting liquid passing through the in use connector and for preventing disengagement of the first and second parts when the male connector portion of the connector is engaged with the female connector portion.

Preferable and/or optional features of the third aspect of the invention are set forth in claims 24 to 32, inclusive.

According to a fourth aspect of the present invention, there is provided a connector for connecting a shower cubicle panel to a shower tray, the connector comprising a first part having an elongate channel portion for receiving an edge of a shower cubicle panel, and a female connector portion; and a second part having a shower tray portion which is formed on, or engageable with, a surface of a shower tray, and a male connector portion which is engageable with the female connector portion, so that the elongate channel portion of the first part of the connector can be held stationary relative to the shower tray portion.

Preferable and/or optional features of the fourth aspect of the invention are set forth in claims 34 and 36.

According to a fifth aspect of the present invention, there is provided a shower cubicle comprising a plurality of shower cubicle panels, each panel including a main panel element having formations on an edge which allows interdigitated connection with an edge of an adjacent panel.

Preferable and/or optional features of the fifth aspect of the invention are set forth in claim 38 and claim 39.

BRIEF DESCRIPTION OF THE DRAWINGS

The present invention will now be more particularly described, by way of example only, with reference to the accompanying drawings, in which.

DETAILED DESCRIPTION OF THE INVENTION

Figure 1:
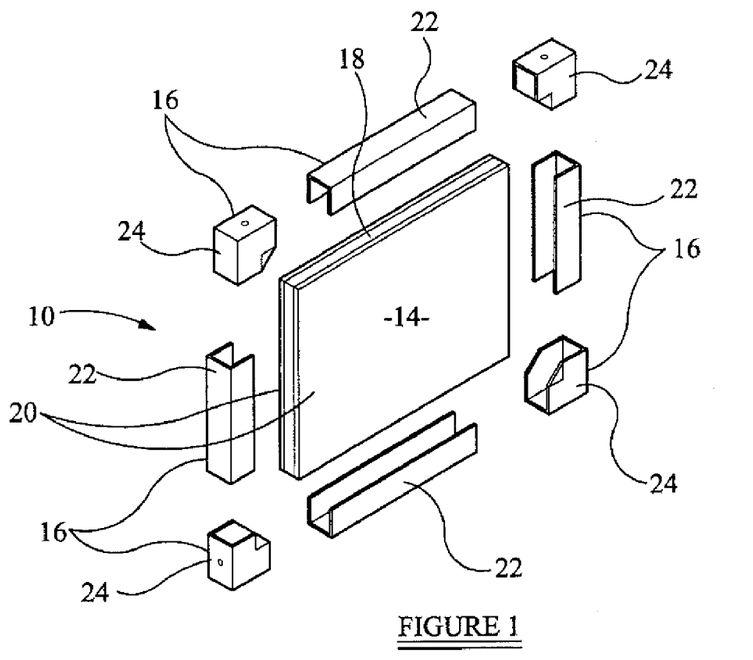
FIG. 1 is an exploded perspective view of a first embodiment of a shower cubicle panel, in accordance with the first aspect of the present invention.

Referring firstly to FIG. 1 of the drawings, a wall panel 10 of a shower cubicle comprises a preformed main panel element 14 (shown in section) and a plurality of edge elements 16 forming part of means for interconnecting adjacent shower cubicle panels. The main panel element 14 is a composite construction of distinct layers of material. In this case, the main panel element 14 is formed from a substrate 18 having two major surfaces, and two external layers 20 which cover the major surfaces of the substrate 18. The external layers 20, although not shown here, may also beneficially extend around the edges of the substrate 18 to fully encapsulate the substrate 18.

The substrate 18 is formed from cellular material, such as expanded foam, for example Styrofoam, or any other suitable substrate material, such as plastics or wood. The external layers 20 are formed from waterproof plastics material, such as polypropylene. The external layers 20 are typically vacuum formed, extruded or cast and then bonded to the major surfaces of the substrate 18.

The edge elements 16 include elongate open-ended channel shaped members 22 which are, for example, plastics or metal mouldings or extrusions. The elongate channel members 22 are adapted to be a tight push-fit on to the edges of the main panel element 14. Each channel member 22 has a length corresponding or substantially corresponding to the longitudinal extent of the edge of the main panel element 14 to which it will be applied.

The edge elements 16 also include corner members 24 which are also, for example, plastics or metal mouldings. These, in a similar fashion to the elongate channel members 22, are adapted to be a tight push-fit on to the corners of the main panel element 14. The corner members 24 are sized to overlap the ends of the elongate channel members 22.

The edge elements 16 are attached to the edges of the main panel element 14 to form liquid tight engagement. The attachment is beneficially achieved by adhesive, ultrasonic welding or other appropriate means.

Figure 2:
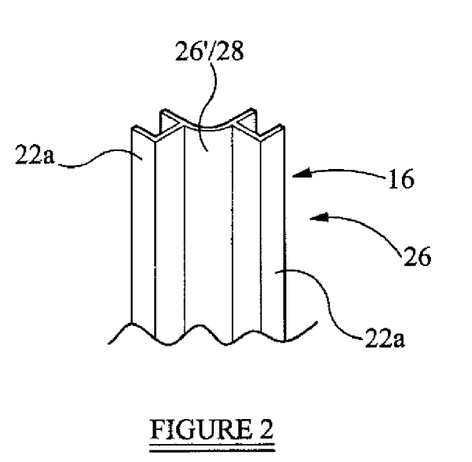
FIG. 2 is an enlarged scrap perspective view of one end of a connector of a shower cubicle panel.

As can be seen in FIG. 2, two channel portions 22a, corresponding to the elongate channel members 22 and arranged generally back-to-back, produce a connector 26 by which two adjacent main panel elements 14 can be interconnected. The connector 26 is unitarily formed by, for example, moulding or extrusion, either from a single material or multiple materials.

The connector 26 includes a connector portion 26' which interconnects the two elongate channel portions 22a. The connector portion 26' is an integral sealing strip 28 formed, for example, of rubber or plastics material.

Figure 3:
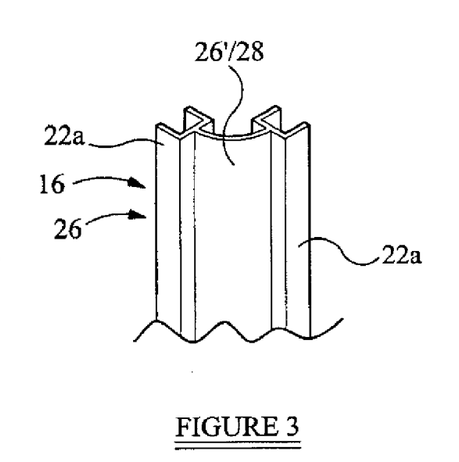
FIG. 3 is an enlarged scrap perspective view of one end of a modification to a connector of shower cubicle panel.

With reference to FIG. 3, the use of multiple materials in the connector 26 allows a connector 26 to be produced which can perform as a hinge. In this case, the connector portion 26'/integral sealing strip 28 is formed of a suitably flexible material to allow relative movement of the interconnected elongate channel portions 22a. Using this arrangement, a shower cubicle panel door (not shown) can be easily provided, or a shower cubicle panel having an irregular or non-typical shape can be assembled.

With this type of connector 26, it also possible that a shower cubicle can be partly assembled off-site. In this case, the cubicle panels 10 can be folded in face-to-face and/or back-to-back (i.e. concertina fashion) via the flexible unitarily formed hinge-type connectors 26. This provides for compact storage and thus simplified transport to the site of installation of the shower cubicle.

Figure 4:
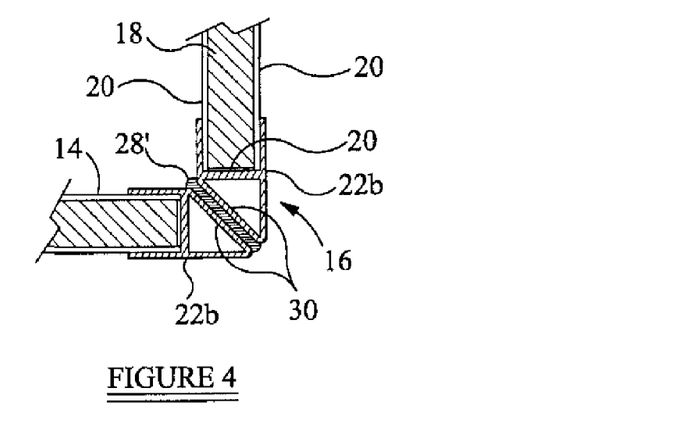
FIG. 4 is a scrap plan view of a further kind of connector of a shower cubicle panel.

FIG. 4 shows an alternative formation of the elongate channel members 22. In this embodiment, the elongate channel members 22b have sloping abutment surfaces 30 so that an appropriately angled joint between two adjacent wall panels 10 can be made. A sealing strip 28' is provided between the two opposing sloping abutment surfaces 30 of the elongate channel members 22b. The sealing strip 28' may be independent of the elongate channel members 22b, or formed as part of the elongate channel members 22b. The sealing strip 28' is formed, for example, of uPVC, and thus enables a liquid tight joint to be formed between the two adjacent wall panels 10. The sealing strip 28' also forms part of the interconnecting means.

Whether a connector 26 or channel members 22b having sloping abutment surfaces 30 are used, the directly interconnected wall panels 10 are attached to a shower tray via the corner members 24, which act as screw ports. In a similar fashion, a ceiling panel 32 is also attachable to the top edges of the assembled wall panels 10 via the corner members 24. See FIG. 5.

Figure 5:
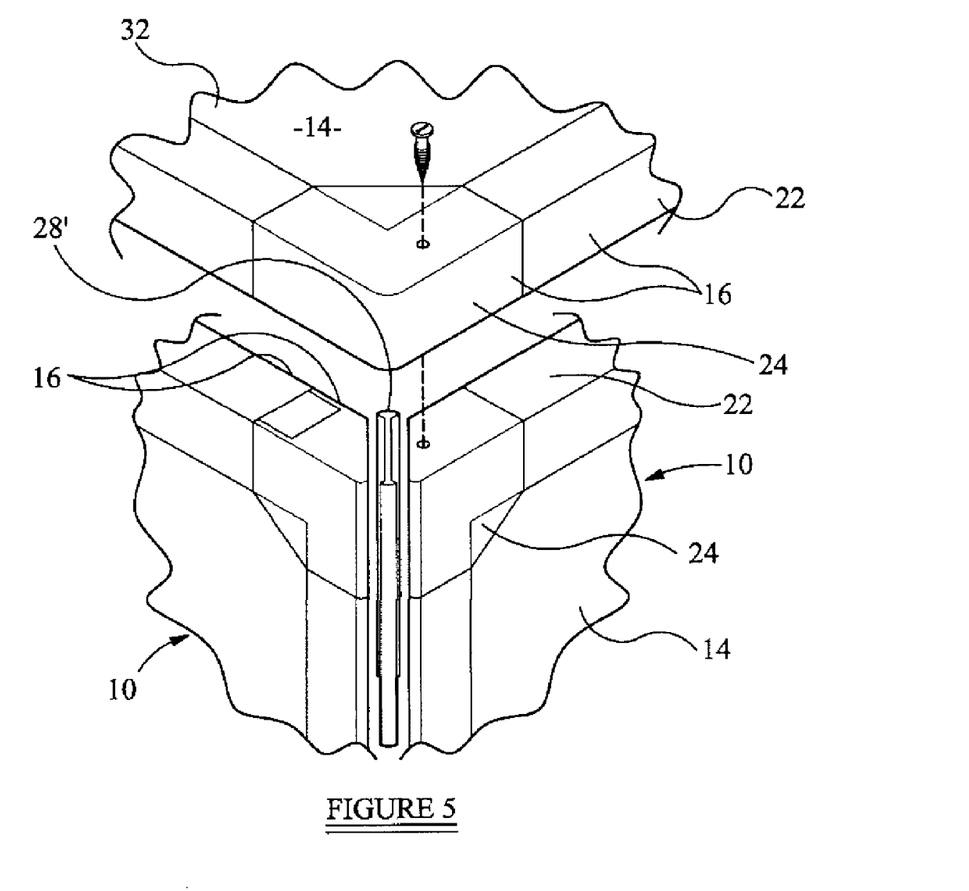
FIG. 5 is a perspective view showing a corner joint between three shower cubicle panels.

By using the corner members 24 attached to the wall panels 10 as screw ports, the integrity of the composite main panel elements 14 of the wall panels 10 is retained, thus eliminating or reducing the possibility of moisture reaching and damaging the substrate 18 or migrating to the exterior of the wall panels 10.

The shower tray is formed of any suitable material, such as moulded GRP or vacuum formed plastics.

The ceiling panel 32, similarly to the wall panels 10, comprises a main panel element 14 of composite multi-layer construction and the edge elements 16 as described above.

Figure 6:
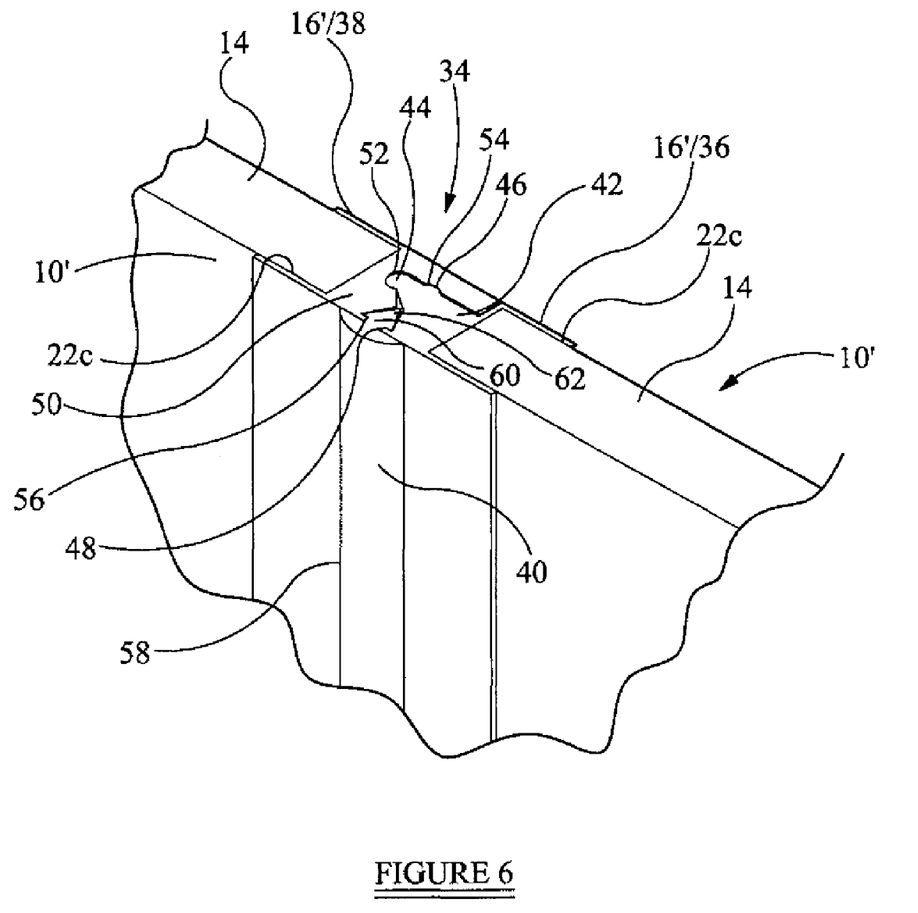
FIG. 6 is a scrap perspective view of another kind of connector of a shower cubicle panel.

In a modification to the connectors 26 described above, a connector 34 for directly interconnecting adjacent shower cubicle panels 10 is shown in FIG. 6. In this embodiment, like references refer to like parts, and further description is thus omitted.

The connector 34 is primarily formed from two edge elements 16' and includes a first part 36, a second part 38, and a, typically rubber, sealing element 40. The first part 36 has an elongate channel portion 22c corresponding in form and function to the elongate channel member 22 of the first embodiment, and a male connector portion 42 formed with a head 44, a rib 46 spaced from the head 44 and extending in parallel with the longitudinal extent of the channel portion 22c, and a lip 48 opposite to and extending in parallel with the rib 46.

The second part 38 has an elongate channel portion 22c corresponding in form and function to the elongate channel member 22, and a generally L-shaped female connector portion 50 formed with a first complementarily or substantially complementarily shaped recess 52 at the intersection of the 'back' and 'foot' of the L-shape able to accept the head 44 of the first part 36 of the connector 34.

The 'back' of the L-shape is formed with a second complementarily or substantially complementarily shaped recess 54 able to accept the rib 46 of the first part 36.

The second part 38 also includes a lip 56 similar to the lip 48 of the first part 36.

In use, two wall panels 10' which are to be connected to each other are provided with the first part 36 of the connector 34 along one edge of one of the wall panels 10' and the second part 38 of the connector 34 along one edge of the other of the main panel elements 14 of the wall panels 10'. The panels 10' are then brought together at an angle to each other so that the head 44 of the male connector portion 42 is inserted into the recess 52 of the female connector portion 50. The two panels are then angularly displaced relative to each other to assume a planar or substantially planar configuration. This angular displacement causes the head 44 to engage in the recess 52, and also the rib 46 to be received in the recess 54. In this configuration, the two lips 48 and 56 are in aligned spaced relationship.

The two wall panels 10' are held in this engaged position by use of the sealing element 40, which also functions as a locking element and which includes a base 58, stem 60 and head 62. The head 62 is urged between the opposing lips 48 and 56 until the lips 48 and 56 take up a position adjacent to the stem 60. The stem 60 is of a suitable length so that, in this position, the base 58 of the sealing element 40 is drawn tightly against the exterior surfaces of the first and second parts 36,38 of the connector 34.

In this way, not only are the two adjacent wall panels 10' securely held in a planar configuration, but they are also prevented from disengaging by the sealing element 40, and liquid is prevented or limited from passing into and through the joint formed by the connector 34.

This type of connector can also be used to interconnect adjacent ceiling panels.

In a modification to the connector 34 described above, a connector 34' is shown in FIG. 7. Again, like references refer to like parts described above, and further description is omitted.

Figure 7:
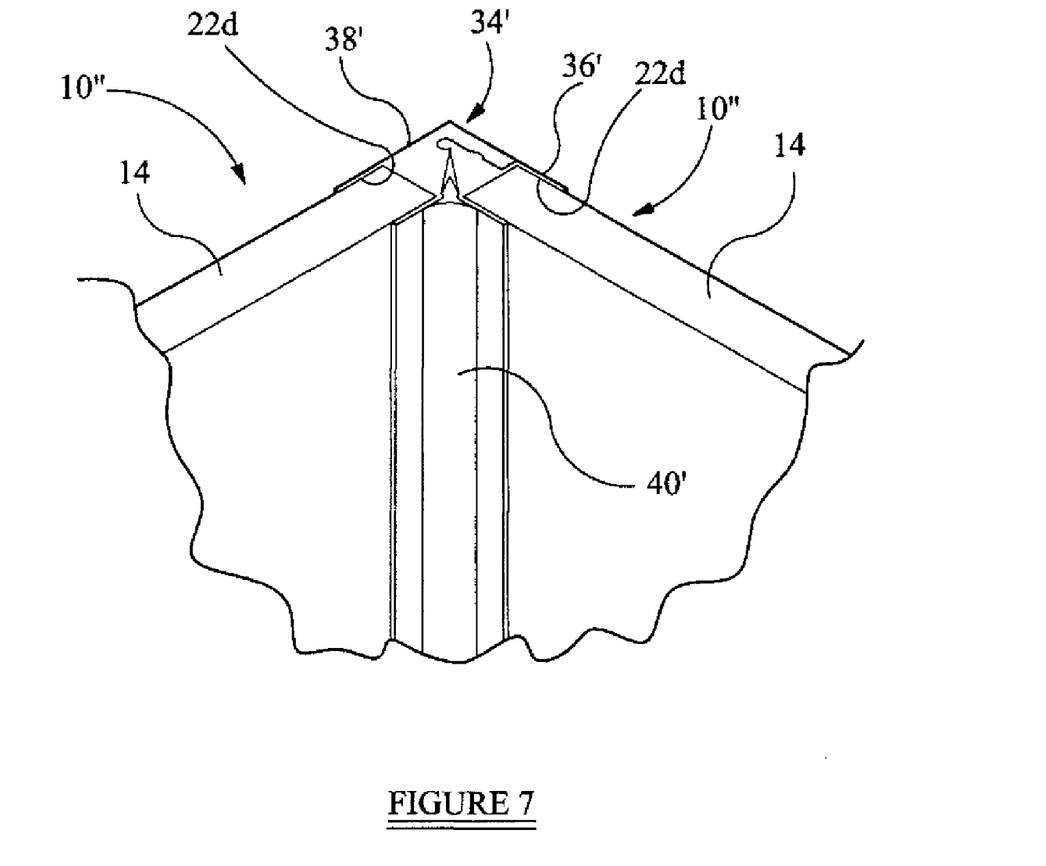
FIG. 7 is a scrap perspective view of another kind of connector of a shower cubicle panel, used at a corner joint.

The connector 34' is intended to allow direct interconnection of two wall panels 10" at or substantially at right angles to each other. The connector 34' has first part 36', second part 38' and sealing element 40'.

This embodiment mainly differs in that elongate channel portion 22d is provided opposite or substantially opposite the 'back' of generally L-shaped second part 38'; and that lips 48,56 are dispensed with, their function instead being performed by opposing edges of the elongate channel portions 22c.

The interconnection of the wall panels 10" is achieved as described above, except that the wall panels 10" are brought into a right-angled relationship, rather than a planar relationship.

It will be realised that the elongate channel portion can be provided at other angles relative to the 'back' of the L-shaped second part so that adjacent wall panels can be connected at other angles relative to each other. In these cases, the lips may or may not be provided.

This type of connector can also be used to interconnect adjacent wall and ceiling panels.

Figure 8:
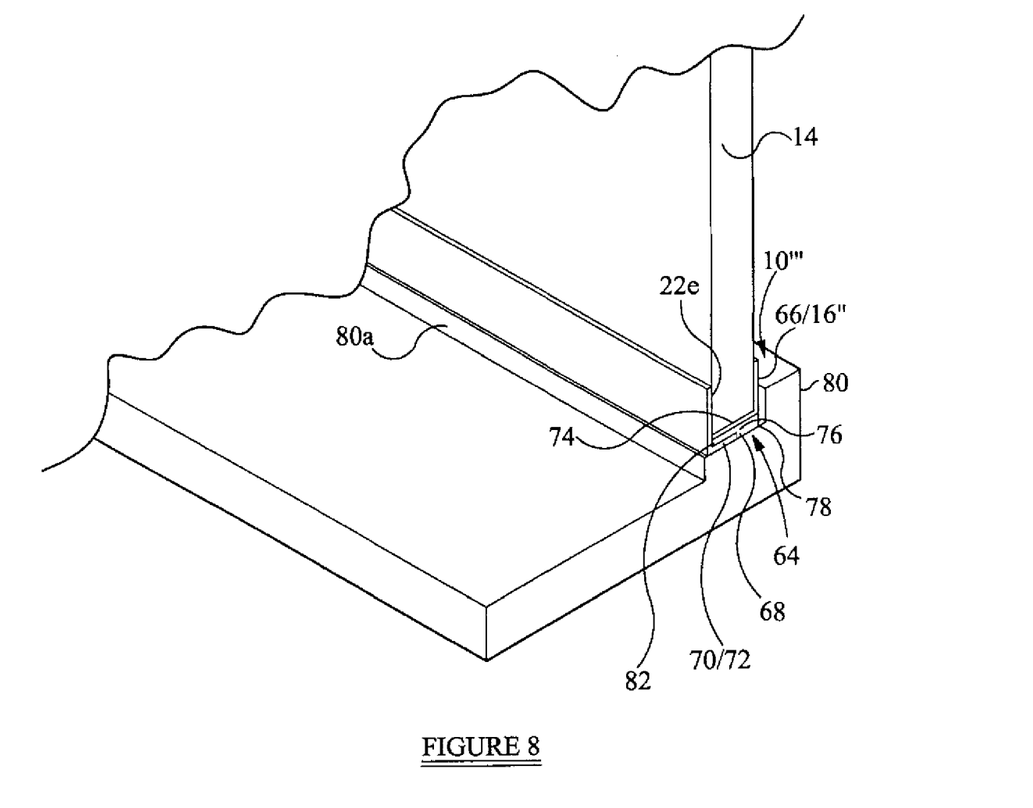
FIG. 8 is a scrap perspective view of yet another kind of connector of a shower cubicle panel for connecting the panel to a shower tray.

FIG. 8 shows a further embodiment of a connector 64 for connecting a wall panel 10''' to a shower tray. Again, like references refer to like parts described above, and further description is omitted.

The connector 64 comprises a first part 66 and a second part 68 which is engageable with the first part 66. The first part 66 is in the form of an edge element 16" comprising an elongate channel portion 22e corresponding in form and function to the elongate channel member 22 of the first embodiment, and a female connector portion 70 which includes an arm element 72 extending in spaced parallel relationship with the base 74 of the channel portion 22e to form a slot 76.

The second part 68 comprises a shower portion 78 which is engaged or engageable with the shower tray 80, and a male connector portion 82 forming a tongue which is releasably engageable in the slot 76 of the female connector portion 70 of the first part 66.

In use, the second part 68 of the connector 64 is either unitarily formed as part of the shower tray 80, or is attached to a surface of the shower tray 80 using any suitable fastening means. In this embodiment, the shower tray 80 includes a step 80a on which the second part 68 of the connector 64 is mounted. In any event, the male connector portion 82 projects inwards towards the centre line of the shower tray 80 so that an installer can erect the shower cubicle by standing in the shower tray 80.

The wall panel 10''' having the first part 66 of the connector 64 along the bottom is then offered up to the second part 68. The male connector portion 82 of the second part 68 is tight push-fit into the slot 76 of the female connector portion 70. The wall panel 10''' is thus held securely to the shower tray 80 by the connector 64.

By utilising the connectors 34, 34' and 64, an entire shower cubicle can be erected from within a shower tray simply by interlocking the adjacent shower cubicle panels and the shower cubicle panels with the shower tray.

In yet another modification, the connectors of the shower cubicle are replaced by unitary formations on the edges of the main panel elements of the shower cubicle panels. The formations allow interdigitation directly between edges of adjacent panels. By way of example, the formations on the edges of the wall panels can be castellations or dove-tail recesses.

The connectors described above form means for interconnecting adjacent cubicle panels and/or cubicle panels with a shower tray.

The main panel element 14, described with reference to the first embodiment, also forms the basis for the wall panels 10', 10" and 10'''.

The main panel element 14 may be formed from only two distinct layers of different material, or may be formed from more than three distinct layers of material. In the latter case, at least two of the layers are of different material.

Advantageously, one or both external layers 20 of the main panel element 14 can be preformed with fittings (not shown) to enable simple attachment of shower fitments (not shown), such as a hand/grab rail, a seat, a soap dish, a shower head support rail. The fitments will, typically, be attached by bonding, thereby maintaining the fluid-tight integrity of the main panel element 14.

By use of the connectors and/or sealing strip, a liquid-tight seal can be easily formed between adjacent panels, and the panels and the shower tray.

The connectors described above can be utilised with main panel elements which are simply a single sheet or layer of material.

Unless specifically identified, the term 'shower cubicle panel' used throughout is intended to encompass a wall panel and a ceiling panel.

A shower cubicle panel, as described above, can be provided as a kit of parts. A shower cubicle including the above-described shower cubicle panels can also be provided as a kit of parts to permit on-site assembly.

It is thus possible to provide a shower cubicle panel which is both simple to produce, easily configurable, light and compact to transport, and cost-effective. It is also possible to provide a shower cubicle formed, at least in part, from such shower cubicle panels and which is simple to erect, easy to transport, and free-standing when assembled. Connectors are also provided which make interconnection of adjacent shower cubicle panels and/or cubicle panels and a shower tray simple. Connectors are also provided which engagement of adjacent wall panels without the need of any kind of screw-threaded fastener. A further connector is also provided which enables engagement of the wall panels with the shower tray without the need of screw-threaded fasteners.

The embodiments described above are given by way of examples only, and further modifications will be apparent to persons skilled in the art without departing from the scope of the invention as defined by the appended claims.

The invention claimed is:

1. A shower cubicle panel comprising a main panel element which is a composite construction of a substrate and an external layer of a different material to the substrate and which fully watertightly encapsulates the substrate, and means for directly interconnecting the cubicle panel to an adjacent panel and a shower tray, the interconnecting means being provided on the peripheral edge or edges of the main panel element and including one or more edge elements which receive the edges of the main panel element without breaching the encapsulating external layer, the or each edge element along the bottom edge of the main panel element including a slot, and the interconnecting means further including a shower part which is on or attachable to the shower tray and which is engageable with the slot of the or each edge element, so that the panel is releasably securable to the shower tray.

2. A shower cubicle panel as claimed in claim 1, wherein the or each main panel element has at least three distinct layers.

3. A shower cubicle panel as claimed in claim 1, wherein the external layer of the or each main panel element is bonded to each major surface of the internal substrate layer.

4. A shower cubicle panel as claimed in claim 1, wherein the or each edge element includes a connector portion for connection of the panel to an adjacent panel and/or shower tray.

5. A shower cubicle panel as claimed in claim 1, wherein the interconnecting means further includes a sealing element which, in use, forms a liquid-tight or substantially liquid-tight seal between two interconnected panels.

6. A shower cubicle panel as claimed in claim 5, wherein the sealing element, in use, prevents disengagement of two interconnected panels.

7. A shower cubicle panel as claimed in claim 5, wherein the sealing element is independent of the or each edge element.

8. A shower cubicle panel as claimed in claim 1, wherein one or more of the edge elements includes a hinge.

9. A shower cubicle panel as claimed in claim 1, wherein one or more said edge elements include corner members which receive corners of the main panel element.

10. A shower cubicle panel as claimed in claim 9, wherein the corner members are screw ports.

11. A shower cubicle panel as claimed in claim 1, wherein the main panel element includes a preformed formation adapted for attachment of a specific kind of shower fitting.

12. A shower cubicle having one or more shower cubicle panels as claimed in claim 1.

13. A shower cubicle as claimed in claim 12, wherein the cubicle is a kit of parts.

14. A connector for connecting adjacent shower cubicle panels, the connector comprising a first part having a first elongate channel portion for receiving an edge of a first shower cubicle panel, and a male connector portion; a second part having a second elongate channel portion for receiving an edge of a second shower cubicle panel, and a female connector portion complementarily or substantially complementarily shaped to receive the male connector portion of the first part of the connector; and a sealing element which is interposable between at least part of the first and second parts of the connector for preventing or limiting liquid passing through the in use connector and for preventing disengagement of the first and second parts when the male connector portion of the connector is engaged with the female connector portion.

15. A connector as claimed in claim 14, wherein the first part, second part and sealing element are independent of each other.

16. A connector as claimed in claim 14, wherein the male connector portion of the first part is integrally formed on the base of the first channel portion.

17. A connector as claimed in claim 16, wherein the first part includes a lip which in use prevents or inhibits undesirable separation of the sealing element.

18. A connector as claimed in claim 14, wherein the female connector portion of the second part is integrally formed on the base of the second channel portion.

19. A connector as claimed in claim 14, wherein female connector portion includes a lip which in use prevents or inhibits undesirable separation of the sealing element.

20. A connector as claimed in claim 14, wherein the sealing element is elongate and flexible.

21. A connector as claimed in claim 14, wherein the sealing element includes a stem which is receivable between at least part of the male connector portion and the female connector portion to retain the first and second parts in engagement with each other.

22. A connector as claimed in claim 14, wherein the sealing element includes a base which, in use, overlaps at least part of the first and second parts of the connector.

23. A shower cubicle comprising two or more shower cubicle panels and a connector as claimed in claim 14 by which the shower cubicle panels are interconnected.

24. A connector for connecting a shower cubicle panel to a shower tray, the connector comprising:
a first part having an elongate channel portion for receiving an edge of a shower cubicle panel, said elongate channel portion defined by at least two vertically extending sides and a base connecting said vertically extending sides, and a female connector portion, said female connection portion including an arm element extending from said elongate channel portion and defining a slot between said base of said elongate channel portion and the shower tray; and
a second part having a shower tray portion which is formed as part of, or engageable with, a surface of a shower tray, and a male connector portion which is engageable with the slot defined by the female connector portion, so that the elongate channel portion of the first part of the connector can be held stationary relative to the shower tray portion.

25. A connector as claimed in claim 24, wherein the male connector portion is in the form of a tongue which is engageable with the female connector portion.

26. A shower cubicle comprising at least one shower cubicle panel, a shower tray, and at least one connector as claimed in claim 24 by which the or each shower cubicle panel and the shower tray are interconnected.

* * * * *